US012747388B2

(12) United States Patent
Yang et al.

(10) Patent No.: US 12,747,388 B2
(45) Date of Patent: Sep. 29, 2026

(54) I-III-VI BASED QUANTUM DOTS AND FABRICATION METHOD THEREOF

(71) Applicant: SAMSUNG SDI CO., LTD., Yongin-si (KR)

(72) Inventors: Hee-Sun Yang, Seoul (KR); Yuri Kim, Gimpo-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 767 days.

(21) Appl. No.: 18/190,832

(22) Filed: Mar. 27, 2023

(65) Prior Publication Data

US 2023/0399566 A1 Dec. 14, 2023

(30) Foreign Application Priority Data

Jun. 13, 2022 (KR) ........................ 10-2022-0071700

(51) Int. Cl.

*C09K 11/62* (2006.01)
*B82Y 20/00* (2011.01)
*B82Y 40/00* (2011.01)
*C09K 11/02* (2006.01)

(52) U.S. Cl.

CPC .......... *C09K 11/621* (2013.01); *C09K 11/025* (2013.01); *B82Y 20/00* (2013.01); *B82Y 40/00* (2013.01)

(58) Field of Classification Search

CPC ..... C09K 11/621; C09K 11/025; B82Y 20/00; B82Y 40/00

USPC .................................................... 252/301.36

See application file for complete search history.

(56) References Cited

U.S. PATENT DOCUMENTS

2020/0399535 A1 12/2020 Mamuye et al.

FOREIGN PATENT DOCUMENTS

| | | | | |
|---|---|---|---|---|
| JP | 2019-85575 A | 6/2019 | | |
| KR | 10-2015-0034621 A | 4/2015 | | |
| KR | 101525524 B1 * | 6/2015 | ............ | C09K 11/08 |
| KR | 10-2017-0078928 A | 7/2017 | | |
| KR | 10-2020-0064946 A | 6/2020 | | |
| KR | 10-2021-0036978 A | 4/2021 | | |
| WO | 2020/162622 A1 | 8/2020 | | |

OTHER PUBLICATIONS

KR 101525524 B1 English translation (Year: 2015).*
Search Report dated Sep. 5, 2023, issued in corresponding Korean Patent Application No. PCT/KR2023/007880 (184 pages).
Uematsu et al., "Narrow band-edge photoluminescence from $AgInS_2$ semiconductor nanoparticles by the formation of amorphous III-VI semiconductor shells", NPG Asia Materials (2018) 10: 713-726.

(Continued)

*Primary Examiner* — Anita Nassiri-Motlagh

(74) *Attorney, Agent, or Firm* — Womble Bond Dickinson (US) LLP

(57) ABSTRACT

Proposed are I-III-VI based quantum dots with high efficiency visible light emission for use as display materials and a method for fabricating the same. The quantum dots include a quantum dot core of Group 11-Group 13-Group 16, and Group 17 element attached to a surface of the quantum dot core.

20 Claims, 9 Drawing Sheets

(56) References Cited

OTHER PUBLICATIONS

Hoisang et al., "Surface ligand chemistry on quaternary $Ag(In_xGa_{1-x})S_2$ semiconductor quantum dots for improving photoluminescence properties", Nanoscale Adv., 2022, 4, 849-857.
Woo et al., "Ultrastable PbSe Nanocrystal Quantum Dots via in Situ Formation of Atomically Thin Halide Adlayers on PbSe(100)", J. Am. Chem. Soc. 2014, 136, 8883-8886.
Kameyama et al., "Wavelength-Tunable Band-Edge Photoluminescence of Nonstoichiometric Ag—In—S Nanoparticles via $Ga^{3+}$ Doping", ACS Appl. Mater. Interfaces 2018, 10, 42844-42855.
Korean Office Action dated Apr. 22, 2024, issued in corresponding Korean Patent Application No. 10-2022-0071700 (5 pages).

* cited by examiner

I-III-VI BASED QUANTUM DOTS AND FABRICATION METHOD THEREOF

CROSS-REFERENCE TO RELATED APPLICATION

The present application claims priority to Korean Patent Application No. 10-2022-0071700 filed on Jun. 13, 2022 in the Republic of Korea, the entire disclosure of which is incorporated herein by reference.

BACKGROUND

Technical Field

The present disclosure relates to quantum dots of non Cd composition and a method for fabricating the same, and more particularly, to I-III-VI based quantum dots and a method for fabricating the same. In particular, the present disclosure relates to I-III-VI based quantum dots for high efficiency visible light emission and a method for fabricating the same.

Description of Related Technology

Quantum dots are semiconductor particles a few tens of nm or less in size, and as opposed to bulk materials, they exhibit various characteristics depending on the size and composition of the particles and have optical and electrical properties that the commonly used semiconducting materials do not have. The quantum dots have better optical properties such as narrower full width at half maximum and higher emission intensity than organic material based fluorescent dyes, and since they are made of inorganic based material, they have a stability advantage. Due to these characteristics, quantum dots are attracting significant attention as materials of color filters for displays, emission diodes (LEDs), biosensors, lasers and solar cells.

SUMMARY

The present disclosure is directed to providing 1-III-VI based quantum dots with high efficiency visible light emission for use as display materials and a method for fabricating the same.

Quantum dots according to the present disclosure include a quantum dot core of Group 11-Group 13-Group 16; and Group 17 element attached to a surface of the quantum dot core.

In the quantum dot core, the Group 11 element may be at least one of Cu, Ag or Au, the Group 13 element may be at least one of In, Ga or Al, and the Group 16 element may be at least one of S, Se or Te.

The Group 11 element: the Group 13 element in the quantum dot core may be at a ratio of 1:1 to 1:10.

In the quantum dot core, the Group 13 element may be $In_{1-x}Ga_x$ where $0.2 \le x \le 0.9$.

The quantum dots may further include ligands on the surface of the quantum dot core.

The ligands may be at least one of thiols, amines, phosphines or a metal salt.

Specifically, the ligands may be at least one of 1-butanethiol, 1-hexanethiol, 1-octanethiol (OTT), 1-undecanethiol, decanethiol, 1-dodecanethiol (DDT), 1-hexadecanethiol, 1-octadecanethiol, amylamine, butylamine. hexylamine, heptylamine, octylamine, nonylamine, decylamine, didecylamine, tetradecylamine, hexadecylamine, octadecylamine, oleylamine (OLA), trihexylamine, trioctylamine (TOA), tridodecylamine, tributylphosphine oxide, tributylphosphine, trioctylphosphine oxide (TOPO), trioctylphosphine (TOP), $ZnF_2$, $ZnCl_2$, $ZnBr_2$, $ZnI_2$, $GaF_3$, $GaCl_3$, $GaBr_3$, $GaI_3$, $AlF_3$, $AlCl_3$, $AlBr_3$ or $AlI_3$.

The quantum dot core may include Ag, In, Ga and S, and the Group 17 element may be attached in an atomic or ionic form.

In an exemplary embodiment, the quantum dot core includes Ag, In, Ga and S, and the Group 17 element is I.

The quantum dots according to the present disclosure may be free of defect state by the Group 17 element.

The quantum dots may have an area ratio of band-edge emission of 90% or more on the entire PL spectrum of the quantum dot core.

The quantum efficiency (PL QY) of the quantum dot core may be 20% or more.

The emission center wavelength of the quantum dot core may be 520 to 540 nm.

The full width at half maximum of the quantum dot core may be 40 nm or less.

The size of the quantum dot core may be 3 to 6 nm.

Under 450 nm blue light excitation, the quantum dot core may show the molar extinction coefficient of $1\times10^5$ $M^{-1}$ $cm^{-1}$ or more.

The quantum dots according to the present disclosure may further include a shell on the quantum dot core, wherein the shell includes at least one of Group 12 and 13 elements and at least one of Group 16 elements.

In this instance, the shell may be a two or more component system composition including at least one of Al, Ga or In and at least one of S or Se.

Additionally, the shell may further include Zn.

The shell may be a multicomponent single or multi shell structure.

The area ratio of band-edge emission on the entire PL spectrum of the quantum dots including the shell may be 95% or more.

The quantum efficiency of the quantum dots including the shell may be 85% or more.

The emission center wavelength of the quantum dots including the shell may be 520 to 540 nm.

The full width at half maximum of the quantum dots including the shell may be 40 nm or less.

The size of the quantum dots including the shell may be 5 to 10 nm.

Under 450 nm blue light excitation, the quantum dots including the shell may show the molar extinction coefficient of $1\times10^5$ $M^{-1}$ $cm^{-1}$ or more.

A method for fabricating quantum dots according to the present disclosure includes forming a quantum dot core of Group 11-Group 13-Group 16 using a halide based metal salt precursor; and fabricating quantum dots including Group 17 element attached to a surface of the quantum dot core, wherein the Group 17 element is supplied from the halide based metal salt precursor.

The halide based metal salt precursor may include a Group 11 precursor and a Group 13 precursor, and the Group 17 element may be supplied from the Group 11 precursor and the Group 13 precursor.

In this instance, the Group 11 precursor and the Group 13 precursor may be at least one of AuF, AuCl, AuBr, AuI, CuF, CuCl, CuBr, CuI, AgF, AgCl, AgBr, AgI, $InF_3$, $InCl_3$, $InBr_3$, $InI_3$, $GaF_3$, $GaCl_3$, $GaBr_3$ or $GaI_3$.

The halide based metal salt precursor may include a Group 11 precursor and a Group 13 precursor, and the Group 11 element and the Group 13 element of the halide based metal salt precursor may be synthesized in powder state or as it is dissolved in a solvent.

The halide based metal salt precursor may further include a Group 16 precursor, and Group 16 element of the Group 16 precursor may be fed as it is dissolved in a solvent.

The solvent may be at least one of 1-octadecene (ODE), oleylamine (OLA), oleic acid (OA), dodecylamine, trioctylamine (TOA) or trioctylphosphine (TOP).

The method for fabricating quantum dots according to the present disclosure may further include forming a shell on the quantum dot core, wherein the shell includes at least one of Group 12 and 13 elements and at least one of Group 16 elements.

The method for fabricating quantum dots according to the present disclosure may further include, after forming the quantum dot core or forming the shell, feeding a ligand material to protect the surface of the quantum dots.

According to the present disclosure, it is possible to fabricate I-III-VI based quantum dots having quantum dot core including Ag, In, Ga and S (hereinafter, AIGS quantum dots) for increasing the quantum efficiency and reducing the defect state emission by surface control.

The high efficiency AIGS quantum dots fabricated according to the present disclosure may be synthesized into visible light emitting quantum dots with higher absorbance than InP quantum dots.

Compared to AIGS quantum dots synthesized using acetate or acetylacetonate (acac) based (i.e., non-halide based) metal salt precursors, the quantum dots synthesized using the halide based metal salt precursor according to the present disclosure include halogen on the surface and thus may be synthesized into quantum dots with enhanced band-edge emission and reduced defect state emission.

According to the present disclosure, it is possible to form AIGS quantum dot core exhibiting a remarkably low level of defect state emission and synthesize quantum dots with high color purity after the core/shell step.

According to the present disclosure, it is possible to reduce the synthesis time compared to the existing method.

According to the present disclosure, it is possible to synthesize green quantum dots with high blue absorbance.

According to the present disclosure, it is possible to obtained quantum dots with dominant band-edge emission for use as display materials.

DETAILED DESCRIPTION

Typically, compound semiconductor compositions made up of Group II-VI elements on the periodic table have been studied, but high efficiency quantum dots include hazardous materials to humans such as Cd or Pb, which makes it difficult to use in industrial applications. Compound semiconductors made up of Group III-V elements typically include InP quantum dots, and InP quantum dots have the quantum efficiency of 95% or more and the narrow full width at half maximum of 40 nm or less, and thus are used in a wide range of industrial applications. In display applications, InP quantum dots are used for a photoconversion layer on a blue LED. Green InP quantum dots require higher concentration than red InP quantum dots due to a difference in absorbance in the blue region depending on the particle size. The core diameter of the green InP quantum dots is about 2 to 2.5 nm, while the core diameter of the red quantum dots is 3 nm or more, and the difference in absorbance between them is a few fold. Accordingly, to have the equal absorbance, the green InP quantum dots need the photoconversion layer having the concentration that is a few times higher than the red InP quantum dots.

1-III-VI based quantum dots typically include $CuInS_2$ (CIS) and $AgInS_2$ (AIS), and typically include Group III elements and further include Ga. Usually, the emission from defect state, not band-edge, is seen, and the broad full width at half maximum of 100 nm or more is observed. By this reason, it is difficult to use as display materials, and they are used in solar cell or infrared device applications. To use 1-III-VI based quantum dots as display materials, they need to have the full width at half maximum of 50 nm or less, dominant band-edge emission and high quantum efficiency.

The accompanying drawings illustrate an exemplary embodiment of the present disclosure, and together with the foregoing detailed description, serve to provide a further understanding of the technical aspects of the present disclosure, and thus the present disclosure should not be construed as being limited to the accompanying drawings.

Quantum dots according to the present disclosure and a method for fabricating the same will be described in detail with reference to the accompanying drawings. The accompanying drawings are provided by way of illustration to convey the technical aspects of the present disclosure fully and completely. Accordingly, the present disclosure is not limited to the accompanying drawings and may be embodied in any other form. It is obvious that the technical and scientific terms as used herein have the meaning of the terms commonly understood by those skilled in the art unless defined otherwise. Additionally, where there is a certain detailed description of known functions and elements that may unnecessarily obscure the subject matter of the present disclosure in the following description and the accompanying drawings, the detailed description is omitted.

Figure 1A:
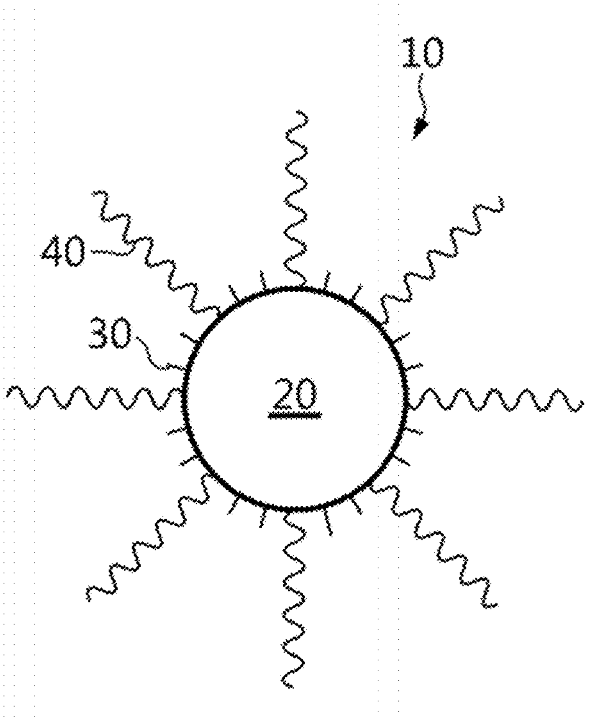
FIGS. 1A and 1B are diagrams of quantum dot according to an embodiment of the present disclosure.
Figure 1B:
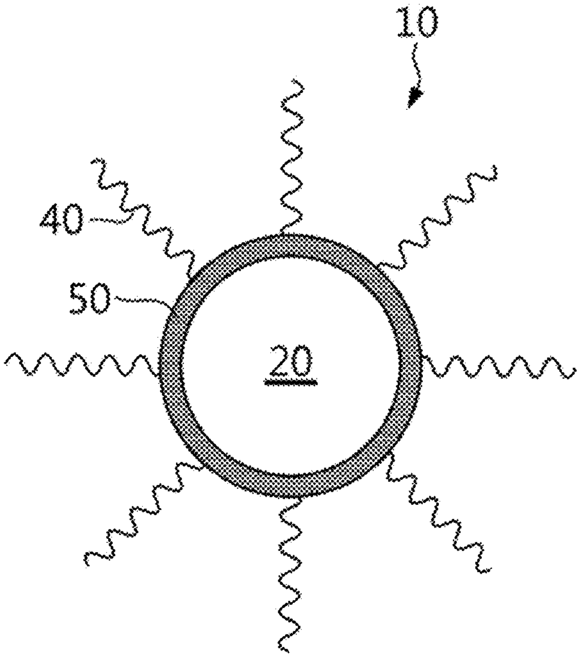

FIG. 1A and FIG. 1B are diagrams of quantum dot according to an embodiment of the present disclosure.

FIG. 1A is a diagram of quantum dot core, and FIG. 1B is a diagram of core/shell quantum dot.

Referring to FIG. 1A, the quantum dots 10 according to an embodiment of the present disclosure include quantum dot core 20 of Group 11-Group 13-Group 16, and Group 17 element 30 attached to the surface of the quantum dot core 20.

The quantum dots 10 are surface-controlled by the Group 17 element 30 to increase the quantum efficiency and reduce the defect state emission. The quantum dot core 20 may be formed using a halide based metal salt precursor, and the Group 17 element is supplied from the halide based metal salt precursor.

In the quantum dot core 20, the Group 11 element may be at least one of Cu, Ag or Au, the Group 13 element may be at least one of In, Ga or Al, and the Group 16 element may be at least one of S, Se or Te. The quantum dots 10 may further include ligands 40 on the surface of the quantum dot core 20. The ligands 40 may include thiols such as 1-dodecanethiol (DDT). Additionally, in addition to the DDT, the ligands 40 may include various alkyl thiols such as 1-octanethiol, hexadecanethiol and decanethiol. Additionally, the ligands 40 may be derived from a solvent used in the fabrication method. Here, the solvent may be at least one of 1-octadecene (ODE), oleylamine (OLA), oleic acid (OA), dodecylamine, trioctylamine (TOA) or trioctylphosphine (TOP). The Group 17 element may be attached in an atomic or ionic form. For example, the Group 17 element is I. The Group 17 element may be F, Cl, Br.

The quantum dots 10 according to the present disclosure may be free of defect state by the Group 17 element. The quantum dots 10 include the Group 17 element, i.e., halogen on the surface, resulting in enhanced band-edge emission and reduced defect state emission. Accordingly, the quantum dots 10 may have an area ratio of band-edge emission of 90% or more on the entire PL spectrum of the quantum dot core 20. Due to the high area ratio of band-edge emission, the quantum dots 10 may have narrow full width at half maximum. The known I-III-VI based quantum dots include various defects therein, and exhibit various emission through the defects. That is, defect state emission is dominated, and the emission spectrum is broad. It can be used in lighting applications. In contrast, the quantum dots 10 according to the present disclosure exhibit the emission spectrum in a desired color, for example, green, at the very narrow full width at half maximum due to the extremely dominant band-edge emission, and thus can be used in display applications.

For example, the quantum dot core 20 may include Ag, In, Ga and S. In this case, the quantum dot core 20 may be referred to as AIGS core.

The Group 11 element:Group 13 element in the quantum dot core 20 may be at a ratio of 1:1 to 1:10. Within the ratio range, the quantum dot core 20 may emit visible light between blue and yellowish green. Additionally, the Group 13 element in the quantum dot core 20 may be $In_{1-x}Ga_x$ where $0.2 \leq x \leq 0.9$. Controlling the ratio between the Group 11 element and the Group 13 element is performed to control the characteristics of the wavelength, and controlling a composition ratio between In and Ga corresponding to the Group 13 element at the controlled ratio between the Group 11 element and the Group 13 element is the unique feature of the present disclosure. In this case, the emission center wavelength of the quantum dot core 20 may be 520 to 540 nm. The center wavelength may correspond to green emission, and may be, for example, 530 nm. The quantum dots 10 including the quantum dot core 20 may be used as display materials.

The quantum efficiency of the quantum dot core 20 may be 20% or more. It signifies that the quantum efficiency is at least 20%, and since defect state is removed by the Group 17 element, the quantum efficiency may be higher.

The full width at half maximum of the quantum dot core 20 may be 40 nm or less. To use the I-III-VI based quantum dots as display materials, the quantum dot core 20 needs to have the narrow full width at half maximum of 50 nm or less. Since the full width at half maximum may be 40 nm or less, the quantum dot core 20 of the quantum dots 10 according to the present disclosure may be used as display materials.

The size of the quantum dot core 20 may be 3 to 6 nm. For example, the average size may be 5.5 nm. When the size of the quantum dot core 20 is outside of the above-described range, it is undesirable in terms of quantum efficiency. The fabrication method according to the present disclosure may be suitable for the synthesis of the quantum dot core 20 in the above-described size.

Under 450 nm blue light excitation, the quantum dot core 20 may show the molar extinction coefficient of $1 \times 10^5$ $M^{-1}$ $cm^{-1}$ or more. This molar extinction coefficient is higher than that of InP quantum dots. That is, the quantum dot core 20 may be green quantum dots with high blue absorbance. As described above, according to the present disclosure, it is possible to form the quantum dot core 20 exhibiting a remarkably low level of defect state emission, especially, AIGS core.

Referring to FIG. 1B, the quantum dots 10 according to an embodiment of the present disclosure may further include shell 50 on the quantum dot core 20, the shell 50 including at least one of Group 12 elements and Group 13 elements and at least one of Group 16 elements. As described above, according to the present disclosure, it is possible to form the quantum dot core 20 exhibiting a remarkably low level of defect state emission, especially AIGS core, and synthesize the quantum dots 10 having high color purity after the core/shell step.

In this instance, the shell 50 may be a two or more component system composition including at least one of Al, Ga or In and at least one of S or Se. For example, the shell 50 may include Ga and S. Additionally, the shell 50 may further include Zn. The Ga precursor for forming the shell 50 may be $GaCl_3$, and the Zn precursor may be $ZnCl_2$.

The shell 50 may be a multicomponent single or multi shell structure. The multi shell may be double or triple. When the shell 50 is a double or triple or multi shell, the shell 50 may have a gradual increase in band gap in the outward direction, i.e., as it is farther away from the quantum dot core 20. The shell 50 has high passivation effect. Accordingly, the PL and quantum efficiency of the quantum dots 10 may be improved.

The area ratio of band-edge emission on the entire PL spectrum of the quantum dots 10 including the shell 50 may be 95% or more. Due to further including the shell 50, the area ratio of band-edge emission may be increased compared to the quantum dot core 20.

The quantum efficiency of the quantum dots 10 including the shell 50 may be 85% or more. Due to further including the shell 50, the quantum efficiency may be higher than the quantum efficiency of the quantum dot core 20. It signifies that the quantum efficiency of the quantum dots 10 is at least 85%, and the quantum efficiency of the quantum dots 10 may be further increased through band gap engineering of the shell 50.

The size of the quantum dots 10 including the shell 50 may be 5 to 10 nm. The size of the quantum dots 10 is the product of adding the thickness of the shell 50 to the quantum dot core 20. The quantum dots 10 including the quantum dot core 20 and further including the shell 50 may have the emission center wavelength of 520 to 540 nm which is the emission center wavelength of the quantum dot core 20. Likewise, due to further including the shell 50, the quantum dots 10 may have the narrower full width at half maximum than the full width at half maximum of the quantum dot core 20, and the full width at half maximum may be 40 nm or less.

Since the quantum dots 10 according to an embodiment of the present disclosure has the area ratio of band-edge emission of 95% or more on the entire PL spectrum, band-edge emission is observed, the full width at half maximum is as narrow as 40 nm or less and the quantum efficiency is high, and thus the quantum dots 10 can be used in display materials.

In the same way as the quantum dot core 20, the quantum dots 10 including the shell 50 may show the molar extinction coefficient of $1\times10^5$ $M^{-1}$ $cm^{-1}$ or more under 450 nm blue light excitation.

Figure 2:
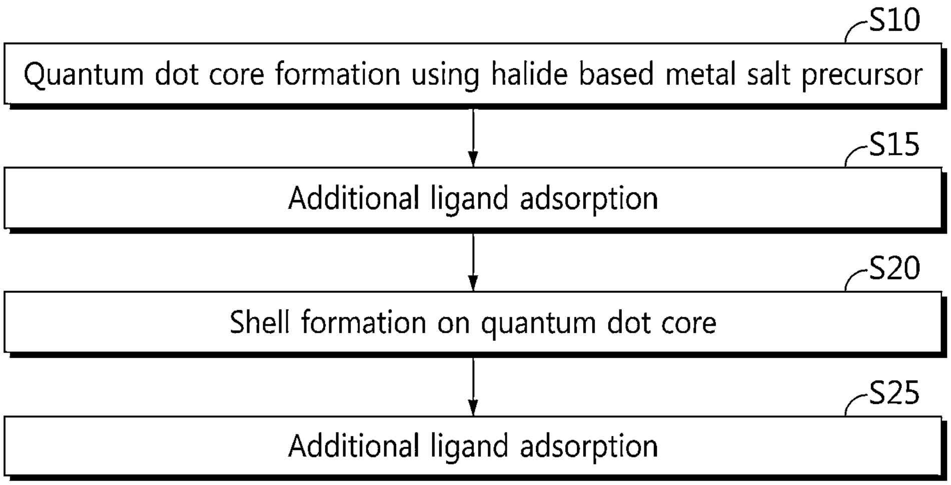
FIG. 2 is a flowchart of a method for fabricating quantum dots according to an embodiment of the present disclosure.

FIG. 2 is a flowchart of a method for fabricating quantum dots according to an embodiment of the present disclosure.

For example, a method for forming the AIGS quantum dot core will be described. To form the AIGS quantum dot core, the halide based metal salt precursor is used (step S10).

As described with reference to FIG. 1A and FIG. 1B, the Group 17 element 30 of the quantum dots 10 is supplied from the halide based metal salt precursor. The halide based metal salt precursor may include a Group 11 precursor and a Group 13 precursor, and the Group 17 element 30 may be supplied from the Group 11 precursor and the Group 13 precursor.

In this instance, the Group 11 precursor and the Group 13 precursor may be at least one of AuF, AuCl, AuBr, AuI, CuF, CuCl, CuBr, CuI, AgF, AgCl, AgBr, AgI, $InF_3$, $InCl_3$, $InBr_3$, $InI_3$, $GaF_3$, $GaCl_3$, $GaBr_3$ or $GaI_3$.

The halide based metal salt precursor may include the Group 11 precursor and the Group 13 precursor, and the Group 11 element and the Group 13 element of the halide based metal salt precursor may be synthesized into the precursor in powder state or as it is dissolved in a solvent.

The halide based metal salt precursor may further include a Group 16 precursor, and the Group 16 element of the Group 16 precursor may be fed as it is dissolved in a solvent.

The solvent may be at least one of 1-octadecene (ODE), oleylamine (OLA), oleic acid (OA), dodecylamine, trioctylamine (TOA) or trioctylphosphine (TOP).

Preferably, for example, the quantum dot core 20 may be synthesized by mixing Ag precursor, I precursor, Ga precursor, S precursor and sulfur with the solvent to prepare a mixed solution and heating the mixed solution. The heating of the mixed solution may be performed in multi-step. First, degassing may be performed by heating at 120° C. Subsequently, the temperature may rise to the growth temperature. In this instance, $N_2$ purging may be performed.

For example, the halide based metal salt precursor of the AIGS quantum dot core 20, for example, AgI, $InI_3$, $GaI_3$ and the solvent are put into a 3-neck flask and degassing is performed at the temperature of 120° C. or less for 30 minutes or more, followed by $N_2$ substitution. Here, the solvent may be ODE, OLA, OA.

Subsequently, thiol based ligands such as DDT and sulfur are fed as the S precursor, and after the temperature rises to 260° C. or more, for example, 280° C., the quantum dot core synthesis reaction is completed within 10 minutes. In addition to the DDT, the S precursor may include alkyl thiols such as 1-octanethiol, hexadecanethiol, decanethiol. The sulfur may be mixed with the solvent such as OLA. In addition to the OLA, the solvent may include any other fatty amines such as dodecylamine, trioctylamine, trioctylphosphine.

After forming the quantum dot core 20, the method may further include the step of lowering the temperature to 200° C. or less and feeding an additional ligand material such as trioctylphosphine (TOP) to protect the quantum dot core surface (step S15). This step is performed to remove defects that may exist on the surface of the quantum dot core 20. In addition to the TOP, the additional ligand material may include OTT and DDT. This step is performed to improve the efficiency and stability of the quantum dot core 20 through additional ligand adsorption.

According to this method, the quantum dots 10 as shown in FIG. 1A may be synthesized, and since the reaction is completed within 10 minutes, synthesis may be performed in a shorter time than the existing reported reaction time of 30 minutes or more, and since the complicated process such as additional feeding is excluded, high reproducibility is achieved.

Subsequently, referring further to FIG. 2, the formed quantum dot core 20 is purified after precipitation using a polar solvent. The polar solvent may be ethanol, acetone. The purification may be performed using a hexane/ethanol combined solvent using a centrifugal separator (9000 rpm, 10 min), followed by re-dispersion in a non-polar solvent to form the shell 50 (step S20). Here, the non-polar solvent may be hexane, octane, toluene, chloroform, ODE, OLA.

The step of forming the shell 50 is the step of forming the shell 50 on the quantum dot core 20, the shell 50 including at least one of Group 12 elements and Group 13 elements and at least one of Group 16 elements.

For example, when forming GaS shell, Ga precursor and S precursor may be fed, causing reaction at the temperature of 200° C. or more, for example, 240° C. for 2 hours, and after the temperature is lowered to 200° C. or less, an additional ligand material such as TOP, DDT may be fed to protect the surface of the core/shell quantum dots (step S25). The Ga precursor may be $GaCl_3$, and the S precursor may be sulfur.

The shell may be formed using any other composition than GaS, and may be formed by applying a suitable shell stock solution onto the core. Additionally, the step of forming the shell may be performed consecutively twice or more times. In this instance, at least one of the type, concentration or reaction temperature of the shell stock solution in each step and the time may vary. In the second reaction, the temperature may be higher or the time may be longer. According to this method, the quantum dots 10 including the shell 50 as shown in FIG. 1B may be synthesized.

According to the present disclosure, to increase the quantum efficiency of the AIGS quantum dots and reduce the defect state emission, the surface controlled quantum dots may be fabricated. The high efficiency AIGS quantum dots fabricated according to the present disclosure may be synthesized into visible light emitting quantum dots with higher absorbance than InP quantum dots. According to the present disclosure, green quantum dots with high blue absorbance may be synthesized. Compared to the AIGS quantum dots synthesized using acetate or acetylacetonate based (i.e., non-halide based) metal salt precursors, the quantum dots synthesized using the halide metal salt precursor according to the present disclosure include halogen on the surface, and thus may be synthesized into quantum dots with enhanced band-edge emission and reduced defect state emission. According to the present disclosure, it is possible to form AIGS core exhibiting a remarkably low level of defect state emission, and synthesize quantum dots having high color purity after the core/shell step. According to the present disclosure, it is possible to reduce the synthesis time compared to the existing method.

The step S25 is the step of feeding the ligand material after the step of forming the shell 50 to protect the surface of the quantum dots 10. The additional ligand material such as TOP, OTT or DDT may be fed to remove defects that may exist on the surface of the quantum dots 10, thereby further improving the efficiency and stability of the quantum dots 10.

Hereinafter, the present disclosure will be described in more detail by describing experimental example.

Example

Figure 3:
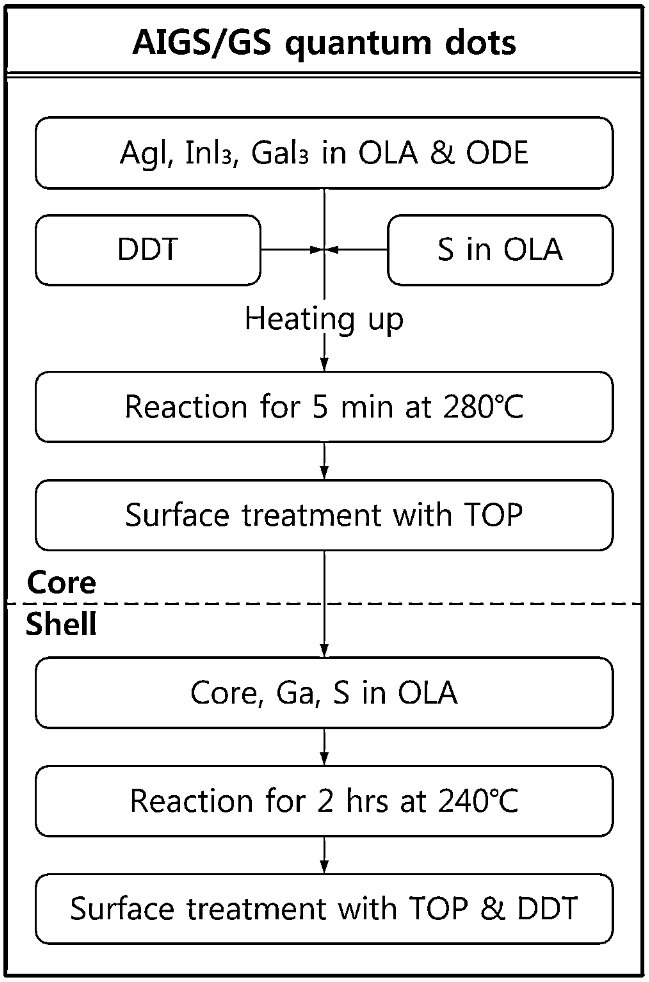
FIG. 3 is a flowchart of a method for fabricating AIGS/GS core/shell quantum dots according to experimental example of the present disclosure.

FIG. 3 is a flowchart of a method for fabricating AIGS/GS core/shell quantum dots according to experimental example of the present disclosure.

To form the AIGS quantum dot core, AgI, $InI_3$, $GaI_3$, ODE and OLA are put into a 3-neck flask, and degassing is performed at 120° C. under a vacuum for 30 minutes, followed by $N_2$ substitution. Two experiments are performed in which the amount of Ag is 0.2 mmol and 0.4 mmol (examples 1 and 2, respectively).

DDT and sulfur S (mixed with OLA) are fed and heated up to 280° C., causing reaction for 5 minutes. TOP is fed at 180° C., causing reaction for 20 minutes to protect the quantum dot core surface. The quantum dot core fabrication is completed.

The quantum dot core is purified using a polar solvent, and the quantum dot core, $GaCl_3$ and sulfur S (mixed with OLA) are put into a 3-neck flask, causing reaction at 240° C. for 2 hours to form GaS shell. DDT and TOP are fed at 200° C., causing reaction for 20 minutes to protect the surface of the core/shell quantum dots. The shell formation is completed.

Subsequently, the core/shell quantum dots are purified using a polar solvent at room temperature for the next experiment and analysis.

Comparative Example

AIGS quantum dots are synthesized using a non-halide based precursor. Ag acetate ($AgC_2H_3O_2$), Ga acetylacetonate [$Ga(C_5H_7O_2)_3$], In acetate, ODE and OLA are put into a 3-neck flask and degassing is performed at 120° C. under a vacuum for 30 minutes, followed by $N_2$ substitution. Two experiments are performed in which the amount of Ag is 0.2 mmol and 0.4 mmol (comparative examples 1 and 2, respectively).

Subsequently, the quantum dot core and core/shell quantum dots are fabricated by the same process as the example.

Characteristics Evaluation

The absorption and emission characteristics are evaluated in colloidal state by dispersing in a non-polar solvent such as hexane after the precipitation of the synthesized quantum dot core and core/shell quantum dots in a polar solvent.

Evaluation Tool

To analyze the emission characteristics of the synthesized nanocrystals (quantum dot core and core/shell quantum dots), the nanocrystals are dispersed in hexane, and PL is measured using PL equipment (Darsa Pro-5200, PSI Co. Ltd) using 500 W Xenon arc lamp as a light source at room temperature, and to analyze the size and shape of the dispersed nanocrystals, high resolution transmittance electron microscopy (HRTEM) (JEOL JEM 4010) is used, and to identify the element attached to the particle surface of the core, X-ray photoelectron spectroscopy (XPS) (Thermo Scientific Inc., K-alpha) is used.

Experimental Results

Figure 4A:
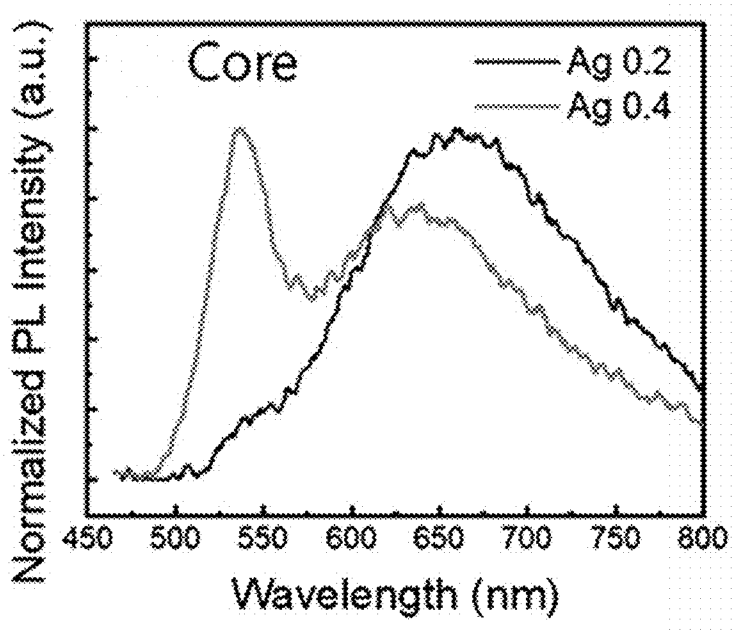
FIG. 4A and FIG. 4B show the emission spectrums of AIGS quantum dot core and AIGS/GS core/shell quantum dots according to comparative example.
Figure 4B:
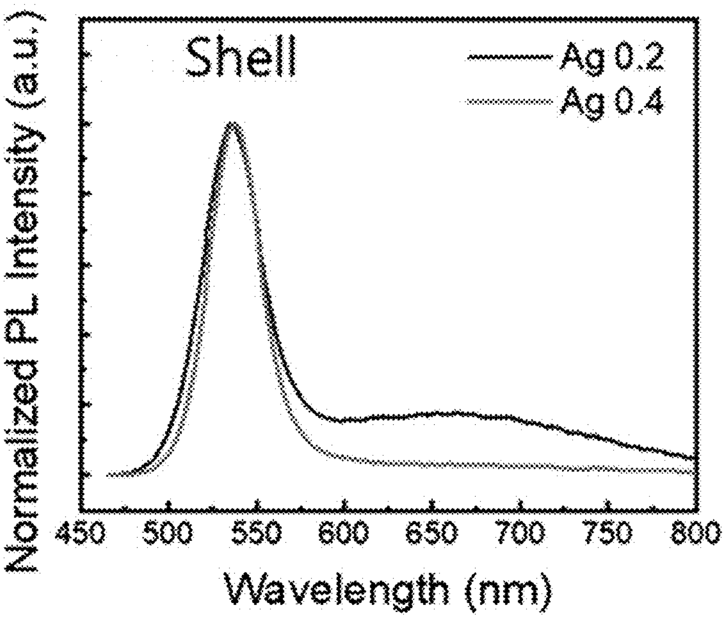

FIG. 4A and FIG. 4B show the emission spectrums of AIGS quantum dot core and AIGS/GS core/shell quantum dots according to comparative example.

FIG. 4A shows the normalized emission (normalized PL) spectrum of the core of the quantum dots of comparative examples 1 and 2, and FIG. 4B shows the normalized emission spectrum of the AIGS/GS core/shell quantum dots of comparative examples 1 and 2.

The emission characteristics of the AIGS core and AIGS/GS core/shell synthesized according to comparative example are shown in Table 1.

The defect state emission peak area of the AIGS core compared to the band-edge emission is 20%:80% in comparative example 2 (0.4 mmol) and 1%:99% in comparative example 1 (0.2 mmol), showing that the band-edge emission is rare and the defect state emission is dominant.

The defect state emission peak area of the AIGS/GS core/shell compared to the band-edge emission is 80%:20% in comparative example 2 (0.4 mmol) and 50%:50% in comparative example 1 (0.2 mmol). The ratio of defect state emission is lower than that of the core, but the defect state emission still has high intensity, and this level is difficult to use in industrial applications.

TABLE 1

| Synthesis using non-halide based precursor | Main peak (nm) | Full width at half maximum (nm) | Quantum efficiency (%) |
|---|---|---|---|
| Ag 0.2 mmol core (comparative example 1) | 661 | 161 | 9.5 |
| Ag 0.4 mmol core (comparative example 2) | 538 | 193 | 10.3 |
| Ag 0.2 mmol core/shell (comparative example 1) | 527 | 46.5 | 40 |
| Ag 0.4 mmol core/shell (comparative example 2) | 522 | 37 | 43 |

Figure 5A:
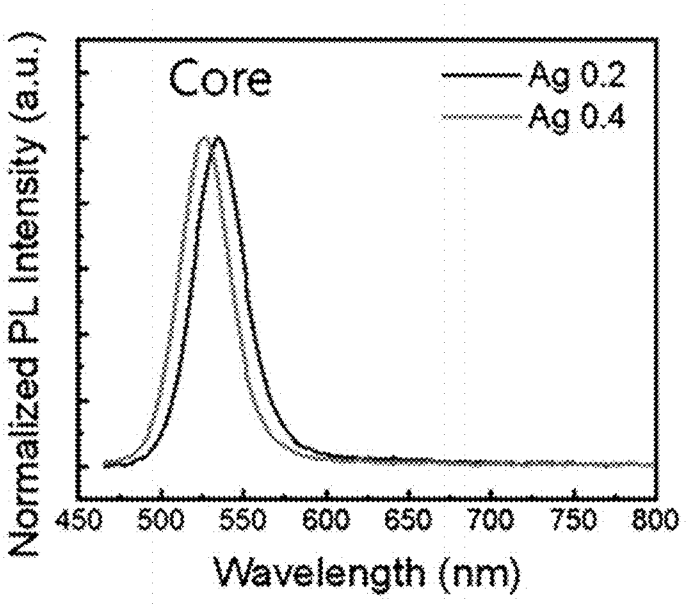
FIG. 5A and FIG. 5B show the emission spectrums of AIGS quantum dot core and AIGS/GS core/shell quantum dots according to experimental example of the present disclosure.
Figure 5B:
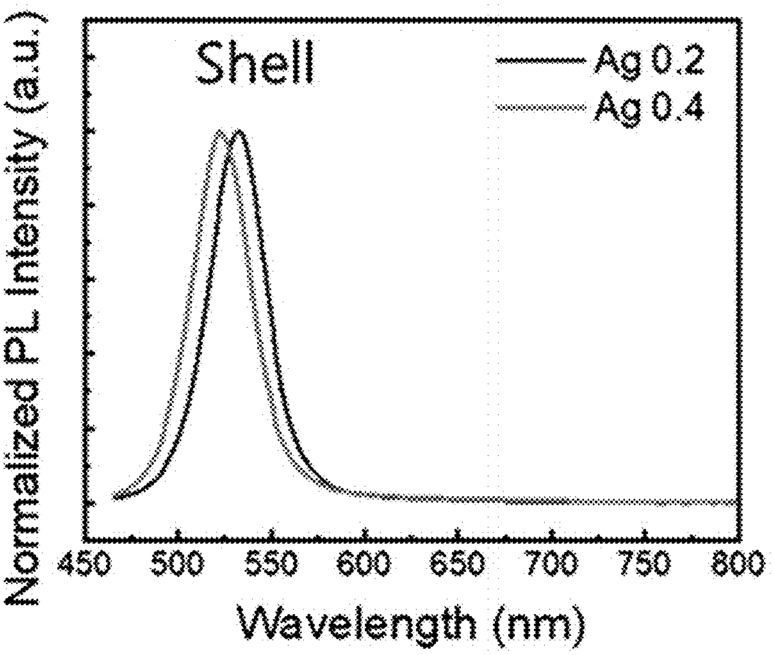

FIGS. 5A and 5B show the emission spectrums of AIGS quantum dot core and AIGS/GS core/shell quantum dots according to experimental example of the present disclosure.

FIG. 5A shows the normalized emission spectrum of the core of the quantum dots of examples 1 and 2, and FIG. 5B shows the normalized emission spectrum of the AIGS/GS core/shell quantum dots of examples 1 and 2.

The emission characteristics of the AIGS core and AIGS/GS core/shell synthesized according to example are shown in Table 2.

TABLE 2

| Synthesis using halide based precursor | Main peak (nm) | Full width at half maximum (nm) | Quantum efficiency (%) |
|---|---|---|---|
| Ag 0.2 mmol core (example 1) | 535 | 36 | 24.4 |
| Ag 0.4 mmol core (example 2) | 527 | 36.3 | 21 |

TABLE 2-continued

| Synthesis using halide based precursor | Main peak (nm) | Full width at half maximum (nm) | Quantum efficiency (%) |
|---|---|---|---|
| Ag 0.2 mmol core/shell (example 1) | 533 | 36 | 86 |
| Ag 0.4 mmol core/shell (example 2) | 522 | 37 | 85 |

It is found that the quantum efficiency of the AIGS/GS core/shell synthesized using the halide based precursor is 86% and 85% respectively when the amount of Ag is 0.2 mmol (example 1) and 0.4 mmol (example 2). Defect state-induced emission is not observed, signifying that the defect state is removed.

When comparing FIG. 4A with FIG. 5A, i.e., when comparing the synthesis results using the acetate or acetylacetonate based (i.e., non-halide based) metal salt precursor with the synthesis results using the halide based precursor according to the experimental example of the present disclosure, the emission characteristics of the core synthesized using the non-halide based precursor exhibits the dominant defect state emission (wavelength of 600 nm or more), while when the halide based precursor is used, it can be seen that the defect state emission significantly reduces and the band-edge emission is the main emission wavelength (530 nm).

The shelling process is equally performed on the non-halide based core and the halide based precursor core. When comparing FIG. 4B with FIG. 5B, even in the core/shell structure, the quantum dots synthesized using the non-halide based precursor exhibit much higher defect state emission than the quantum dots using the halide based precursor.

For use of light emitting materials in display applications, materials having high color purity are required, and as the full width at half maximum is narrower, the color purity is higher. As the defect state emission intensity is higher, the full width at half maximum increases and the color purity decreases, and it is difficult to use in industrial applications. Accordingly, the quantum dots synthesized using the halide based precursor are suitable for use in the industrial applications due to the significantly low defect state emission.

The defect free quantum dots according to the present disclosure can be seen through the surface analysis results using XPS.

Figure 6:
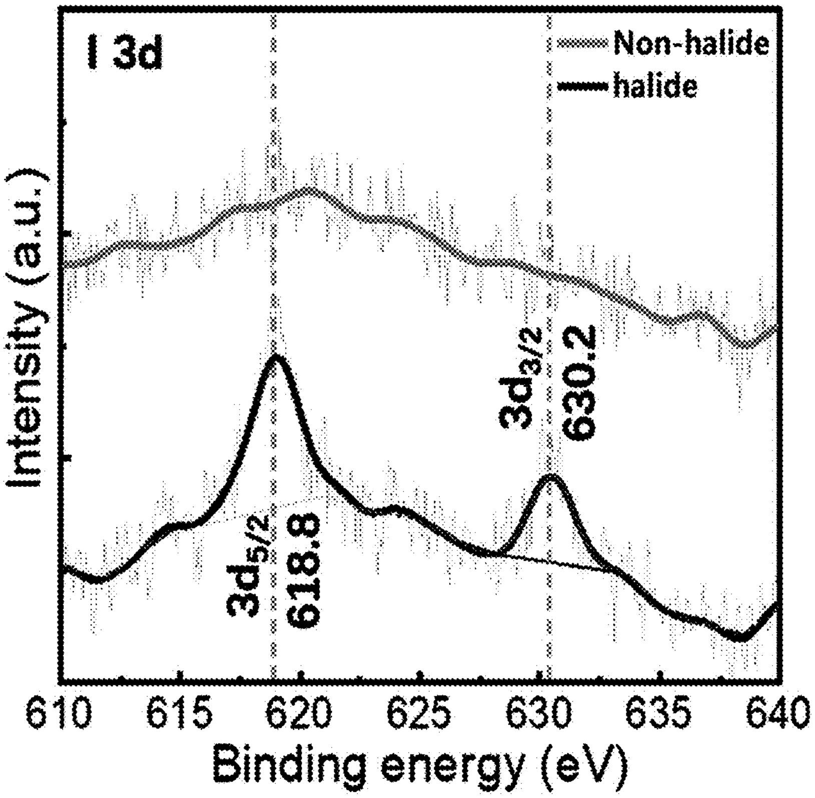
FIG. 6 shows I 3d XPS spectrum of AIGS quantum dot core according to comparative example and AIGS quantum dot core according to experimental example of the present disclosure.

FIG. 6 shows I 3d XPS spectrum of AIGS quantum dot core according to comparative example and AIGS quantum dot core according to experimental example of the present disclosure.

As shown in FIG. 6, as opposed to the use of the non-halide based precursor, the XPS analysis results of the surface of the core synthesized using the halide based precursor according to the present disclosure reveal that halogen (I in the experimental example of the present disclosure) fed as the precursor is attached to the surface of the core ($I3d_{5/2}$, $I3d_{3/2}$ peaks are clearly seen). The halide fed as the precursor is attached to the surface.

It can be seen from the XPS results that halide is attached to the surface of the quantum dot core using the halide based precursor, and through this, the defect state is removed. The halide removes dangling bonds present on the surface of the quantum dot core, thereby improving the stability. The presence of the dangling bonds in the PL characteristics causes the reduced quantum efficiency due to electron trap sites and additional emission by the defect state, and according to the present disclosure, the removal of the dangling bonds by halogen increases the total quantum efficiency, reduces the defect state emission and increases the band-edge emission.

Figure 7:
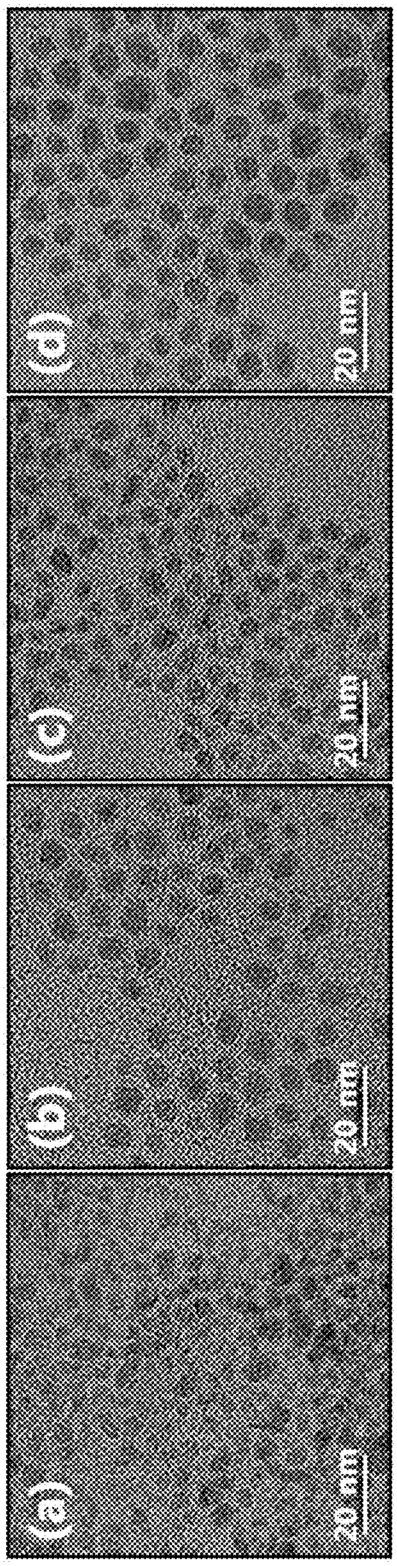
FIG. 7 is a transmission electron microscopy (TEM) image of AIGS quantum dot core and AIGS/GS core/shell quantum dots according to comparative example and AIGS quantum dot core and AIGS/GS core/shell quantum dots according to experimental example of the present disclosure.

FIG. 7 is a transmission electron microscopy (TEM) image of AIGS quantum dot core and AIGS/GS core/shell quantum dots according to comparative example and AIGS quantum dot core and AIGS/GS core/shell quantum dots according to experimental example of the present disclosure.

As a result of determining the size and distribution of particles through the TEM image of the AIGS quantum dots synthesized using the non-halide based precursor and the halide based precursor, as shown in FIG. 7, the average particle size is about 4.7 nm in the non-halide based precursor based core and about 7.5 nm in the core/shell, and the quantum dots synthesized using the halide based precursor have the core about 5.5 nm in size on average and the core/shell 7.5 nm in size. However, the size of the core is not limited to the above-described size and may change between 3 and 6 nm on average depending on the synthesis temperature.

Figure 8A:
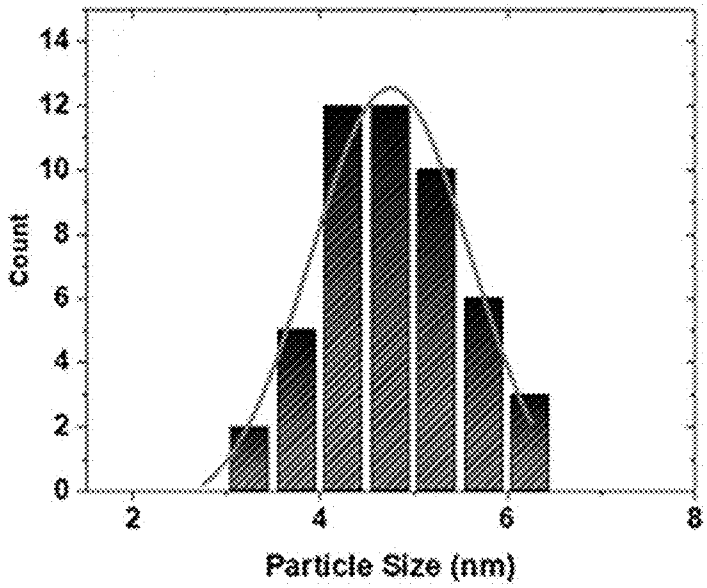
FIG. 8A and FIG. 8B show size distribution histograms of AIGS quantum dot core according to comparative example and AIGS quantum dot core according to experimental example of the present disclosure.
Figure 8B:
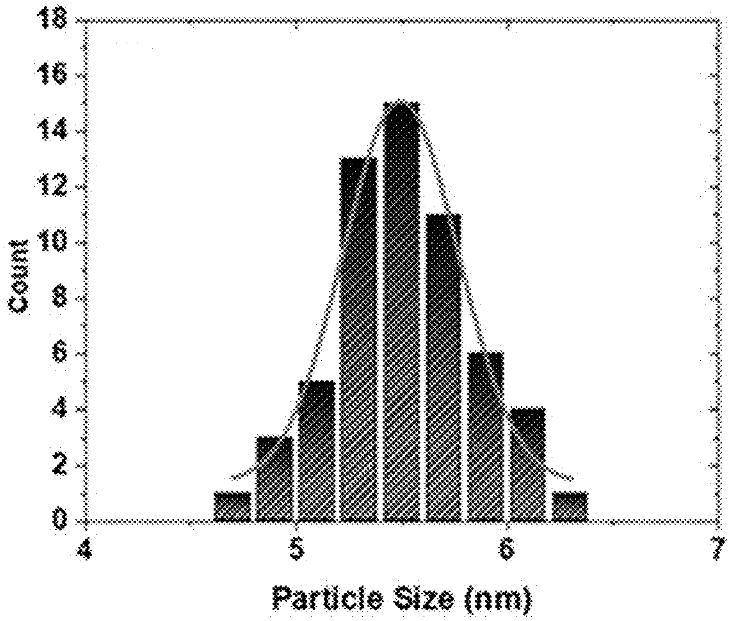

FIG. 8A and FIG. 8B show size distribution histograms of AIGS quantum dot core according to comparative example and AIGS quantum dot core according to experimental example of the present disclosure.

As a result of determining a size distribution of 50 particles randomly selected in the TEM image of the synthesized quantum dot core, it is found that the size distribution of the quantum dots synthesized through the non-halide based precursor is 4.7±0.7 nm as shown in FIG. 8A, and the size distribution of the quantum dots synthesized through the halide based precursor is 5.5±0.4 nm as shown in FIG. 8B. As shown in FIG. 8A and FIG. 8B, since the size distribution of the quantum dots synthesized using the halide based precursor is narrower than that of the quantum dots synthesized using the non-halide based precursor, it is found that it is possible to grow in uniform size.

It is found that the distribution of the core and the distribution of the core/shell have the same average size, but synthesis using the halide based precursor has uniform distribution. The uniformity of particles may act as an important variable in the molar extinction coefficient (a measure of how much 1 M quantum dot particles can absorb light) comparison as described below. Since the number of moles of the quantum dots is set according to the size of the quantum dot core, as the uniformity is higher, a more accurate value can be obtained in the extinction coefficient calculation.

Figure 9A:
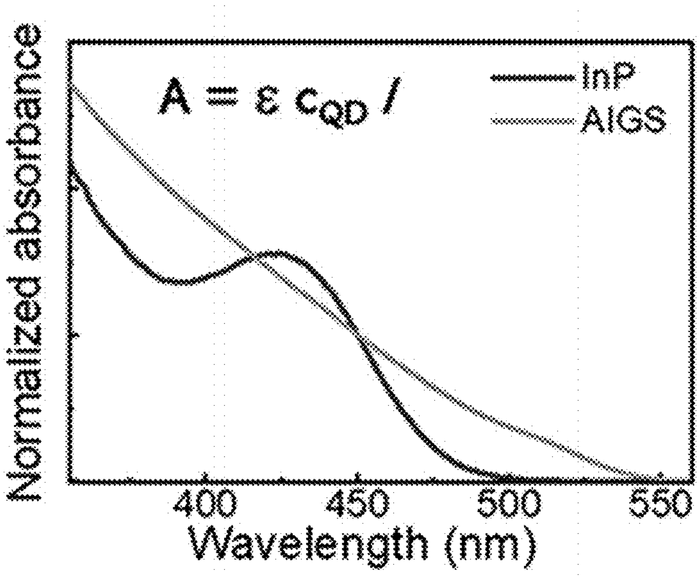
FIGS. 9A and 9B show the absorption and absorbance spectrums of InP quantum dots according to another comparative example and AIGS/GS core/shell quantum dots according to experimental example of the present disclosure.
Figure 9B:
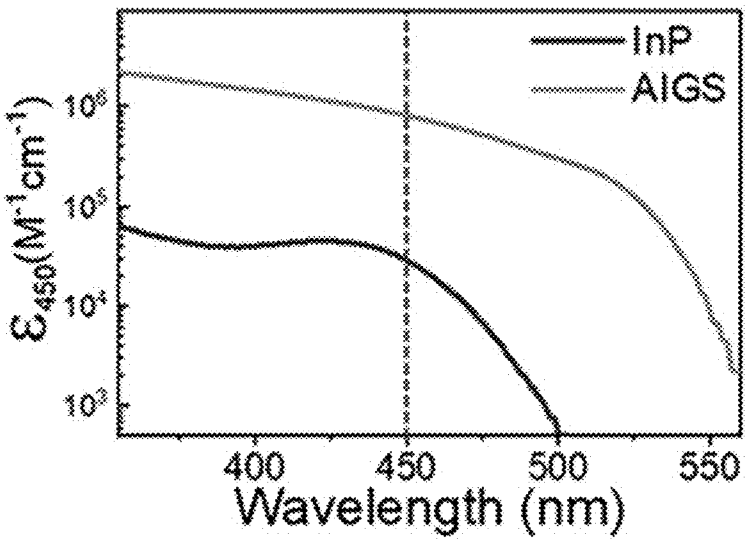

FIG. 9A shows absorption and FIG. 9B shows absorbance spectrum of InP quantum dots according to another comparative example and AIGS/GS core/shell quantum dots according to experimental example of the present disclosure.

In an attempt to increase the low absorbance of green InP quantum dots, as a result of comparing the molar extinction coefficient (F) measured under blue light (450 nm) excitation between the InP quantum dots and the AIGS quantum dots synthesized using the halide based precursor, it is found that the AIGS quantum dots (i.e., $8.07\times10^5$ $M^{-1}$ $cm^{-1}$) have the extinction coefficient that is about 28 times or more higher than the InP quantum dots (i.e., $2.87\times10^4$ $M^{-1}$ $cm^{-1}$). Here, the extinction coefficient is calculated by the Beer-Lambert law.

This work was financially supported by the Technology Innovation Program (20010737, 20016332) funded by the Ministry of Trade, Industry & Energy (MOTIE, Korea), the National Research Foundation of Korea (NRF) grant funded by Ministry of Science, ICT & Future Planning (MSIP)

(2020M3H4A3082656), Basic Science Research Program through the NRF funded by Ministry of Education (2015R1A6A1A03031833).

While the present disclosure has been hereinabove illustrated and described with respect to particular embodiments, the present disclosure is not limited thereto and various modifications and changes will be made thereto by those skilled in the art without departing from the technical aspects of the present disclosure.

What is claimed is:

1. Quantum dots, comprising:

a quantum dot core of Group 11-Group 13-Group 16; and Group 17 element attached to a surface of the quantum dot core.

2. The quantum dots according to claim 1, wherein in the quantum dot core, the Group 11 element comprises at least one of Cu, Ag or Au, the Group 13 element comprises at least one of In, Ga or Al, and the Group 16 element comprises at least one of S, Se or Te.

3. The quantum dots according to claim 1, wherein the Group 11:Group 13 ratio in the quantum dot core is at a ratio range of 1:1 to 1:10.

4. The quantum dots according to claim 1, wherein in the quantum dot core, the Group 13 element is $In_{1-x}Ga_x$ where $0.2 \leq x \leq 0.9$.

5. The quantum dots according to claim 1, further comprising:

ligands on the surface of the quantum dot core.

6. The quantum dots according to claim 5, wherein the ligands comprise at least one of thiols, amines, phosphines or a metal salt.

7. The quantum dots according to claim 1, wherein the quantum dot core includes Ag, In, Ga and S, and the Group 17 element is attached in an atomic or ionic form.

8. The quantum dots according to claim 1, wherein the quantum dot core includes Ag, In, Ga and S, and the Group 17 element is I.

9. The quantum dots according to claim 1, wherein a defect state is configured to be removed by the Group 17 element.

10. The quantum dots according to claim 1, further comprising:

a shell on the quantum dot core, wherein the shell includes at least one of Group 12 and 13 elements and at least one of Group 16 elements.

11. The quantum dots according to claim 10, wherein the shell is a two or more component system composition including at least one of Al, Ga or In and at least one of S or Se.

12. The quantum dots according to claim 11, wherein the shell further includes Zn.

13. A method for fabricating quantum dots, comprising:

forming a quantum dot core of Group 11-Group 13-Group 16 using a halide based metal salt precursor; and fabricating quantum dots including Group 17 element attached to a surface of the quantum dot core, wherein the Group 17 element is supplied from the halide based metal salt precursor.

14. The method for fabricating quantum dots according to claim 13, wherein the halide based metal salt precursor includes a Group 11 precursor and a Group 13 precursor, and the Group 17 element is supplied from the Group 11 precursor and the Group 13 precursor.

15. The method for fabricating quantum dots according to claim 14, wherein the Group 11 precursor and the Group 13 precursor are at least one of AuF, AuCl, AuBr, AuI, CuF, CuCl, CuBr, CuI, AgF, AgCl, AgBr, AgI, $InF_3$, $InCl_3$, $InBr_3$, $InI_3$, $GaF_3$, $GaCl_3$, $GaBr_3$ or $GaI_3$.

16. The method for fabricating quantum dots according to claim 13, wherein the halide based metal salt precursor includes a Group 11 precursor and a Group 13 precursor, and the Group 11 element and the Group 13 element of the halide based metal salt precursor are synthesized in powder state or as it is dissolved in a solvent.

17. The method for fabricating quantum dots according to claim 13, wherein the halide based metal salt precursor further includes a Group 16 precursor, and Group 16 element of the Group 16 precursor is fed as it is dissolved in a solvent.

18. The method for fabricating quantum dots according to claim 16, wherein the solvent comprises at least one of 1-octadecene (ODE), oleylamine (OLA), oleic acid (OA), dodecylamine, trioctylamine (TOA) or trioctylphosphine (TOP).

19. The method for fabricating quantum dots according to claim 13, further comprising:

forming a shell on the quantum dot core, wherein the shell includes at least one of Group 12 and 13 elements and at least one of Group 16 elements.

20. The method for fabricating quantum dots according to claim 19, after forming the quantum dot core or forming the shell, further comprising:

feeding a ligand material to protect the surface of the quantum dots.

* * * * *